United States Patent
Sheng et al.

(10) Patent No.: US 9,639,213 B2
(45) Date of Patent: May 2, 2017

(54) USING MULTIPLE SIGNALS TO DETECT TOUCH INPUT

(71) Applicant: Sentons Inc., Grand Cayman (KY)

(72) Inventors: Samuel W. Sheng, Saratoga, CA (US);
Shih-Ming Shih, San Jose, CA (US);
Yenyu Hsieh, San Jose, CA (US);
Shirish A. Altekar, Palo Alto, CA (US)

(73) Assignee: Sentons Inc., Cayman Islands (KY)

( * ) Notice: Subject to any disclaimer, the term of this patent is extended or adjusted under 35 U.S.C. 154(b) by 0 days.

(21) Appl. No.: 14/033,316

(22) Filed: Sep. 20, 2013

(65) Prior Publication Data

US 2014/0078112 A1 Mar. 20, 2014

Related U.S. Application Data

(63) Continuation-in-part of application No. 13/451,288, filed on Apr. 19, 2012.

(60) Provisional application No. 61/479,331, filed on Apr. 26, 2011.

(51) Int. Cl.
*G06F 3/043* (2006.01)

(52) U.S. Cl.
CPC ............ *G06F 3/043* (2013.01); *G06F 3/0436* (2013.01)

(58) Field of Classification Search
None
See application file for complete search history.

(56) References Cited

U.S. PATENT DOCUMENTS

| | | |
|---|---|---|
| 4,488,000 A | 12/1984 | Glenn |
| 5,334,805 A * | 8/1994 | Knowles et al. .......... 178/18.04 |
| 5,451,723 A | 9/1995 | Huang et al. |
| 5,563,849 A | 10/1996 | Hall et al. |
| 5,573,077 A | 11/1996 | Knowles |
| 5,637,839 A | 6/1997 | Yamaguchi et al. |
| 5,708,460 A | 1/1998 | Young et al. |
| 5,739,479 A | 4/1998 | Davis-Cannon et al. |
| 5,784,054 A | 7/1998 | Armstrong et al. |
| 5,883,457 A | 3/1999 | Rinde et al. |
| 5,912,659 A | 6/1999 | Rutledge et al. |
| 6,091,406 A | 7/2000 | Kambara et al. |

(Continued)

FOREIGN PATENT DOCUMENTS

| | | |
|---|---|---|
| CN | 101373415 | 2/2009 |
| CN | 101669088 | 3/2010 |

(Continued)

OTHER PUBLICATIONS

Liu et al., "Acoustic Wave Approach for Multi-Touch Tactile Sensing", Micro-NanoMechatronics and Human Science, 2009. MHS 2009. International Symposium, Nov. 9-11, 2009.

*Primary Examiner* — Kent Chang
*Assistant Examiner* — Sujit Shah
(74) *Attorney, Agent, or Firm* — Van Pelt, Yi & James LLP

(57) ABSTRACT

Detecting a location of a touch input is disclosed. Each of a plurality of transmitters coupled to a propagating medium emits a signal that is distinguishable from other signals emitted from other transmitters. The signals from the transmitters are received from at least one receiver coupled to the propagating medium to detect the location of the touch input on a surface of the propagating medium as indicated by an effect of the touch input on each of the distinguishable signals.

21 Claims, 6 Drawing Sheets

(56) References Cited

U.S. PATENT DOCUMENTS

| | | |
|---|---|---|
| 6,232,960 B1 | 5/2001 | Goldman |
| 6,254,105 B1 | 7/2001 | Rinde et al. |
| 6,473,075 B1 | 10/2002 | Gomes et al. |
| 6,492,979 B1 | 12/2002 | Kent et al. |
| 6,535,147 B1 | 3/2003 | Masters et al. |
| 6,567,077 B2 | 5/2003 | Inoue et al. |
| 6,630,929 B1 | 10/2003 | Adler et al. |
| 6,633,280 B1 | 10/2003 | Matsumoto et al. |
| 6,636,201 B1 | 10/2003 | Gomes et al. |
| 6,788,296 B2 * | 9/2004 | Ikeda et al. .................. 345/177 |
| 6,798,403 B2 | 9/2004 | Kitada et al. |
| 6,856,259 B1 | 2/2005 | Sharp |
| 6,891,527 B1 | 5/2005 | Chapman et al. |
| 6,948,371 B2 | 9/2005 | Tanaka et al. |
| 7,000,474 B2 | 2/2006 | Kent |
| 7,006,081 B2 | 2/2006 | Kent et al. |
| 7,116,315 B2 | 10/2006 | Sharp et al. |
| 7,119,800 B2 | 10/2006 | Kent et al. |
| 7,187,369 B1 | 3/2007 | Kanbara et al. |
| 7,193,617 B1 | 3/2007 | Kanbara et al. |
| 7,204,148 B2 | 4/2007 | Tanaka et al. |
| 7,218,248 B2 | 5/2007 | Kong et al. |
| 7,274,358 B2 | 9/2007 | Kent |
| RE39,881 E * | 10/2007 | Flowers .................... 178/18.01 |
| 7,315,336 B2 | 1/2008 | North et al. |
| 7,345,677 B2 | 3/2008 | Ing et al. |
| 7,411,581 B2 | 8/2008 | Hardie-Bick |
| 7,456,825 B2 | 11/2008 | Kent et al. |
| 7,511,711 B2 | 3/2009 | Ing et al. |
| 7,545,365 B2 | 6/2009 | Kent et al. |
| 7,554,246 B2 | 6/2009 | Maruyama et al. |
| 7,583,255 B2 | 9/2009 | Ing |
| 7,649,807 B2 | 1/2010 | Ing |
| 7,683,894 B2 | 3/2010 | Kent |
| 7,880,721 B2 * | 2/2011 | Suzuki .................... G01S 11/16 345/157 |
| 7,920,133 B2 | 4/2011 | Tsumura et al. |
| 8,085,124 B2 | 12/2011 | Ing |
| 8,228,121 B2 | 7/2012 | Benhamouda et al. |
| 8,237,676 B2 | 8/2012 | Duheille et al. |
| 8,319,752 B2 | 11/2012 | Hardie-Bick |
| 8,325,159 B2 | 12/2012 | Kent et al. |
| 8,358,277 B2 | 1/2013 | Mosby et al. |
| 8,378,974 B2 | 2/2013 | Aroyan et al. |
| 8,392,486 B2 | 3/2013 | Ing |
| 8,427,423 B2 | 4/2013 | Tsumura |
| 8,436,806 B2 | 5/2013 | Almalki et al. |
| 8,436,808 B2 | 5/2013 | Chapman et al. |
| 8,493,332 B2 | 7/2013 | D'Souza |
| 8,576,202 B2 | 11/2013 | Tanaka et al. |
| 8,619,063 B2 | 12/2013 | Chaine et al. |
| 8,638,318 B2 | 1/2014 | Gao et al. |
| 8,648,815 B2 | 2/2014 | Kent et al. |
| 8,659,579 B2 | 2/2014 | Nadjar et al. |
| 8,670,290 B2 | 3/2014 | Aklil et al. |
| 8,681,128 B2 | 3/2014 | Scharff et al. |
| 8,692,809 B2 | 4/2014 | D'Souza |
| 8,692,810 B2 | 4/2014 | Ing |
| 8,692,812 B2 | 4/2014 | Hecht |
| 8,730,213 B2 | 5/2014 | D'Souza et al. |
| 8,749,517 B2 | 6/2014 | Aklil |
| 8,823,685 B2 | 9/2014 | Scharff et al. |
| 8,854,339 B2 | 10/2014 | Kent et al. |
| 8,890,852 B2 | 11/2014 | Aroyan et al. |
| 8,896,429 B2 | 11/2014 | Chaine |
| 8,896,564 B2 | 11/2014 | Scharff et al. |
| 8,917,249 B1 | 12/2014 | Buuck et al. |
| 8,941,624 B2 | 1/2015 | Kent et al. |
| 8,946,973 B2 | 2/2015 | Pelletier |
| 8,994,696 B2 | 3/2015 | Berget et al. |
| 9,030,436 B2 | 5/2015 | Ikeda |
| 9,046,959 B2 | 6/2015 | Schevin et al. |
| 9,046,966 B2 | 6/2015 | D'Souza |
| 9,058,071 B2 | 6/2015 | Esteve |
| 9,099,971 B2 | 8/2015 | Lynn et al. |
| 2001/0050677 A1 * | 12/2001 | Tosaya .......................... 345/179 |
| 2002/0185981 A1 | 12/2002 | Dietz et al. |
| 2003/0197691 A1 * | 10/2003 | Fujiwara ............ G06F 3/03545 345/179 |
| 2003/0206162 A1 | 11/2003 | Roberts |
| 2004/0133366 A1 | 7/2004 | Sullivan |
| 2004/0160421 A1 | 8/2004 | Sullivan |
| 2004/0183788 A1 | 9/2004 | Kurashima et al. |
| 2004/0239649 A1 | 12/2004 | Ludtke |
| 2004/0246239 A1 | 12/2004 | Knowles et al. |
| 2006/0071912 A1 | 4/2006 | Hill et al. |
| 2006/0114233 A1 | 6/2006 | Radivojevic et al. |
| 2006/0139340 A1 | 6/2006 | Geaghan |
| 2006/0166681 A1 * | 7/2006 | Lohbihler ................ G01S 5/02 455/456.2 |
| 2006/0262104 A1 | 11/2006 | Sullivan et al. |
| 2007/0109274 A1 * | 5/2007 | Reynolds ..................... 345/173 |
| 2007/0165009 A1 | 7/2007 | Sakurai et al. |
| 2007/0171212 A1 | 7/2007 | Sakurai et al. |
| 2007/0211022 A1 | 9/2007 | Boillot |
| 2007/0214462 A1 | 9/2007 | Boillot |
| 2007/0229479 A1 * | 10/2007 | Choo et al. ................... 345/177 |
| 2007/0279398 A1 | 12/2007 | Tsumura et al. |
| 2008/0018618 A1 * | 1/2008 | Hill et al. ..................... 345/177 |
| 2008/0030479 A1 | 2/2008 | Lowles et al. |
| 2008/0081671 A1 | 4/2008 | Wang et al. |
| 2008/0105470 A1 | 5/2008 | Van De Ven et al. |
| 2008/0111788 A1 | 5/2008 | Rosenberg et al. |
| 2008/0174565 A1 | 7/2008 | Chang et al. |
| 2008/0198145 A1 | 8/2008 | Knowles et al. |
| 2008/0231612 A1 | 9/2008 | Hill et al. |
| 2008/0284755 A1 * | 11/2008 | Hardie-Bick ................ 345/177 |
| 2009/0103853 A1 | 4/2009 | Daniel |
| 2009/0146533 A1 | 6/2009 | Leskinen et al. |
| 2009/0160728 A1 | 6/2009 | Emrick et al. |
| 2009/0167704 A1 | 7/2009 | Terlizzi et al. |
| 2009/0237372 A1 | 9/2009 | Kim et al. |
| 2009/0271004 A1 | 10/2009 | Zecchin et al. |
| 2009/0273583 A1 * | 11/2009 | Norhammar ................. 345/177 |
| 2009/0315848 A1 | 12/2009 | Ku et al. |
| 2010/0026667 A1 * | 2/2010 | Bernstein ..................... 345/177 |
| 2010/0044121 A1 | 2/2010 | Simon et al. |
| 2010/0045635 A1 | 2/2010 | Soo |
| 2010/0079264 A1 | 4/2010 | Hoellwarth |
| 2010/0117993 A1 * | 5/2010 | Kent ............................. 345/177 |
| 2010/0156818 A1 | 6/2010 | Burrough et al. |
| 2010/0165215 A1 | 7/2010 | Shim |
| 2010/0185989 A1 | 7/2010 | Shiplacoff et al. |
| 2010/0188356 A1 | 7/2010 | Vu et al. |
| 2010/0245265 A1 | 9/2010 | Sato et al. |
| 2010/0269040 A1 | 10/2010 | Lee |
| 2010/0277431 A1 | 11/2010 | Klinghult |
| 2010/0315373 A1 | 12/2010 | Steinhauser et al. |
| 2010/0321312 A1 | 12/2010 | Han et al. |
| 2010/0321325 A1 | 12/2010 | Springer et al. |
| 2010/0321337 A1 | 12/2010 | Liao et al. |
| 2011/0012717 A1 | 1/2011 | Pance et al. |
| 2011/0018695 A1 | 1/2011 | Bells et al. |
| 2011/0042152 A1 * | 2/2011 | Wu ............................ 178/18.03 |
| 2011/0057903 A1 | 3/2011 | Yamano et al. |
| 2011/0063228 A1 * | 3/2011 | St. Pierre ............ G06F 3/0436 345/173 |
| 2011/0080350 A1 | 4/2011 | Almalki et al. |
| 2011/0084912 A1 | 4/2011 | Almalki |
| 2011/0156967 A1 | 6/2011 | Oh et al. |
| 2011/0167391 A1 | 7/2011 | Momeyer et al. |
| 2011/0175813 A1 | 7/2011 | Sarwar et al. |
| 2011/0199342 A1 * | 8/2011 | Vartanian ................ G06F 3/016 345/177 |
| 2011/0260990 A1 | 10/2011 | Ali et al. |
| 2011/0298670 A1 | 12/2011 | Jung et al. |
| 2011/0316790 A1 | 12/2011 | Ollila et al. |
| 2012/0001875 A1 * | 1/2012 | Li et al. ...................... 345/177 |
| 2012/0026114 A1 | 2/2012 | Lee et al. |
| 2012/0050230 A1 | 3/2012 | Harris |
| 2012/0062564 A1 | 3/2012 | Miyashita et al. |
| 2012/0068939 A1 | 3/2012 | Pemberton-Pigott |
| 2012/0068970 A1 | 3/2012 | Pemberton-Pigott |
| 2012/0081337 A1 | 4/2012 | Camp et al. |

(56) References Cited

U.S. PATENT DOCUMENTS

| | | |
|---|---|---|
| 2012/0088548 A1 | 4/2012 | Yun et al. |
| 2012/0120031 A1 | 5/2012 | Thuillier |
| 2012/0126962 A1 | 5/2012 | Ujii et al. |
| 2012/0127088 A1 | 5/2012 | Pance et al. |
| 2012/0188889 A1 | 7/2012 | Sambhwani et al. |
| 2012/0194466 A1 | 8/2012 | Posamentier |
| 2012/0200517 A1* | 8/2012 | Nikolovski .................. 345/173 |
| 2012/0229407 A1 | 9/2012 | Harris et al. |
| 2012/0232834 A1 | 9/2012 | Roche et al. |
| 2012/0272089 A1 | 10/2012 | Hatfield et al. |
| 2013/0059532 A1 | 3/2013 | Mahanfar et al. |
| 2013/0249831 A1 | 9/2013 | Harris |
| 2014/0185834 A1 | 7/2014 | Fromel et al. |

FOREIGN PATENT DOCUMENTS

| | | |
|---|---|---|
| FR | 2948787 A1 | 2/2011 |
| KR | 1020040017272 | 2/2004 |
| KR | 1020050092179 | 2/2004 |
| KR | 1020070005580 | 1/2007 |
| KR | 1020080005990 | 1/2008 |
| WO | 2006115947 A2 | 11/2006 |
| WO | 2006115947 A3 | 11/2006 |
| WO | 2011010037 A1 | 1/2011 |
| WO | 2011024434 A1 | 3/2011 |
| WO | 2011048433 A1 | 4/2011 |
| WO | 2011051722 | 5/2011 |
| WO | 2012010912 | 1/2012 |

* cited by examiner

USING MULTIPLE SIGNALS TO DETECT TOUCH INPUT

CROSS REFERENCE TO OTHER APPLICATIONS

This application is a continuation in part of co-pending U.S. patent application Ser. No. 13/451,288 entitled METHOD AND APPARATUS FOR ACTIVE ULTRASONIC TOUCH DEVICES filed Apr. 19, 2012, which is incorporated herein by reference for all purposes, which claims priority to U.S. Provisional Application No. 61/479,331, entitled METHOD AND APPARATUS FOR ACTIVE ULTRASONIC TOUCH DEVICES filed Apr. 26, 2011 which is incorporated herein by reference for all purposes.

BACKGROUND OF THE INVENTION

Various technologies have been used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes bending wave technology. One example includes the Elo Touch Systems Acoustic Pulse Recognition, commonly called APR, manufactured by Elo Touch Systems of 301 Constitution Drive, Menlo Park, Calif. 94025. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the Elo IntelliTouch Plus™ of Elo Touch Systems. The SAW technology sends ultrasonic waves in a guided pattern using reflectors on the touch screen to detect a touch. However, sending the ultrasonic waves in the guided pattern increases costs and may be difficult to achieve. Detecting additional types of inputs, such as multi-touch inputs, may not be possible or may be difficult using SAW or APR technology. Therefore there exists a need for a better way to detect an input on a surface.

BRIEF DESCRIPTION OF THE DRAWINGS

Various embodiments of the invention are disclosed in the following detailed description and the accompanying drawings.

DETAILED DESCRIPTION

Figure 1:
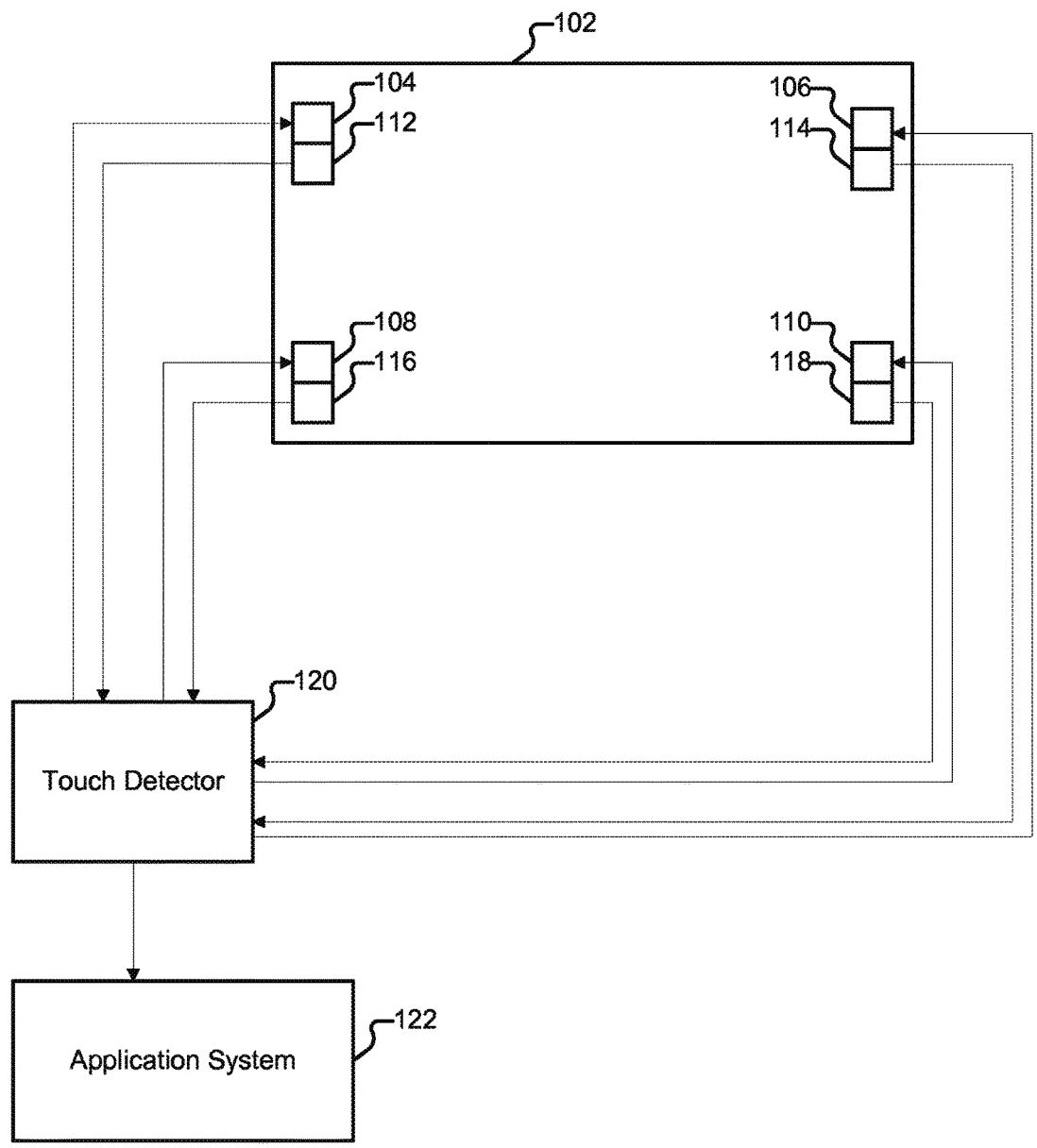
FIG. 1 is a block diagram illustrating an embodiment of a system for detecting a surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting a location of a touch input is disclosed. For example, a user touch input on a glass surface of a display screen is detected. In some embodiments, a plurality of transmitters coupled to a propagating medium (e.g., glass) emits signals that are distinguishable from other signals emitted from other transmitters. For example, a signal such as an acoustic or ultrasonic signal is propagated freely through a propagating medium with a touch input surface from each transmitter coupled to the propagating medium. In some embodiments, the signals emitted by the transmitters are distinguishable from each other by varying a phase of the signals (e.g., code division multiplexing, code division multiple access (CDMA), spread spectrum multiple access (SSMA)), a frequency range of the signals (e.g., frequency division multiplexing, frequency division multiple access (FDMA)) or a timing of the signals (e.g., time division multiplexing, time division multiple access (TDMA)).

At least one receiver is coupled to the propagating medium, and the receiver is configured to receive the signals from the transmitters to detect the location of the touch input on a surface of the propagating medium as indicated by the effect of the touch input on each of the distinguishable signals. For example, when the surface of the propagating medium is touched, the emitted signals propagating through the propagating medium are disturbed (e.g., the touch causes an interference with the propagated signals). In some embodiments, by processing the received signals and comparing it against corresponding expected signals without the disturbance, a location on the surface associated with the touch input is at least in part determined. For example, a relative time difference between when the disturbance was detected in the received signals is used to determine the touch input location on the surface. In various embodiments, the touch input includes a physical contact to a surface using a human finger, pen, pointer, stylus, and/or any other body parts or objects that can be used to contact or disturb the surface. In some embodiments, the touch input includes an input gesture and/or a multi-touch input.

In some embodiments, the received signal is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional cost due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

FIG. 1 is a block diagram illustrating an embodiment of a system for detecting a touch input surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and receivers/sensors 112, 114, 116, and 118. The locations where transmitters 104, 106, 108, and 110 and sensors 112, 114, 116, and 118 have been coupled to propagating signal medium 102, as shown in FIG. 1, are merely an example. Other configurations of transmitter and sensor locations may exist in various embodiments. Although FIG. 1 shows sensors located adjacent to transmitters, sensors may be located apart from transmitters in other embodiments. In some embodiments, a single transducer is used as both a transmitter and a sensor. In various embodiments, the propagating medium includes one or more of the following: panel, table, glass, screen, door, floor, whiteboard, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducers, transmitters, sensors, and/or any other transmitters and transducers capable of propagating a signal through medium 102. Examples of sensors 112, 114, 116, and 118 include piezoelectric transducers, electromagnetic transducers, laser vibrometer transmitters, and/or any other sensors and transducers capable of detecting a signal on medium 102. In some embodiments, the transmitters and sensors shown in FIG. 1 are coupled to medium 102 in a manner that allows a user's input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, transmitters 104, 106, 108, and 110 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 112, 114, 116, and 118 receive the propagated signals. In another embodiment, the transmitters/sensors in FIG. 1 are attached to a flexible cable coupled to medium 102 via an encapsulant and/or glue material and/or fasteners.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends signals to be propagated by transmitters 104, 106, 108, and 110. Detector 120 also receives the signals detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Figure 2:
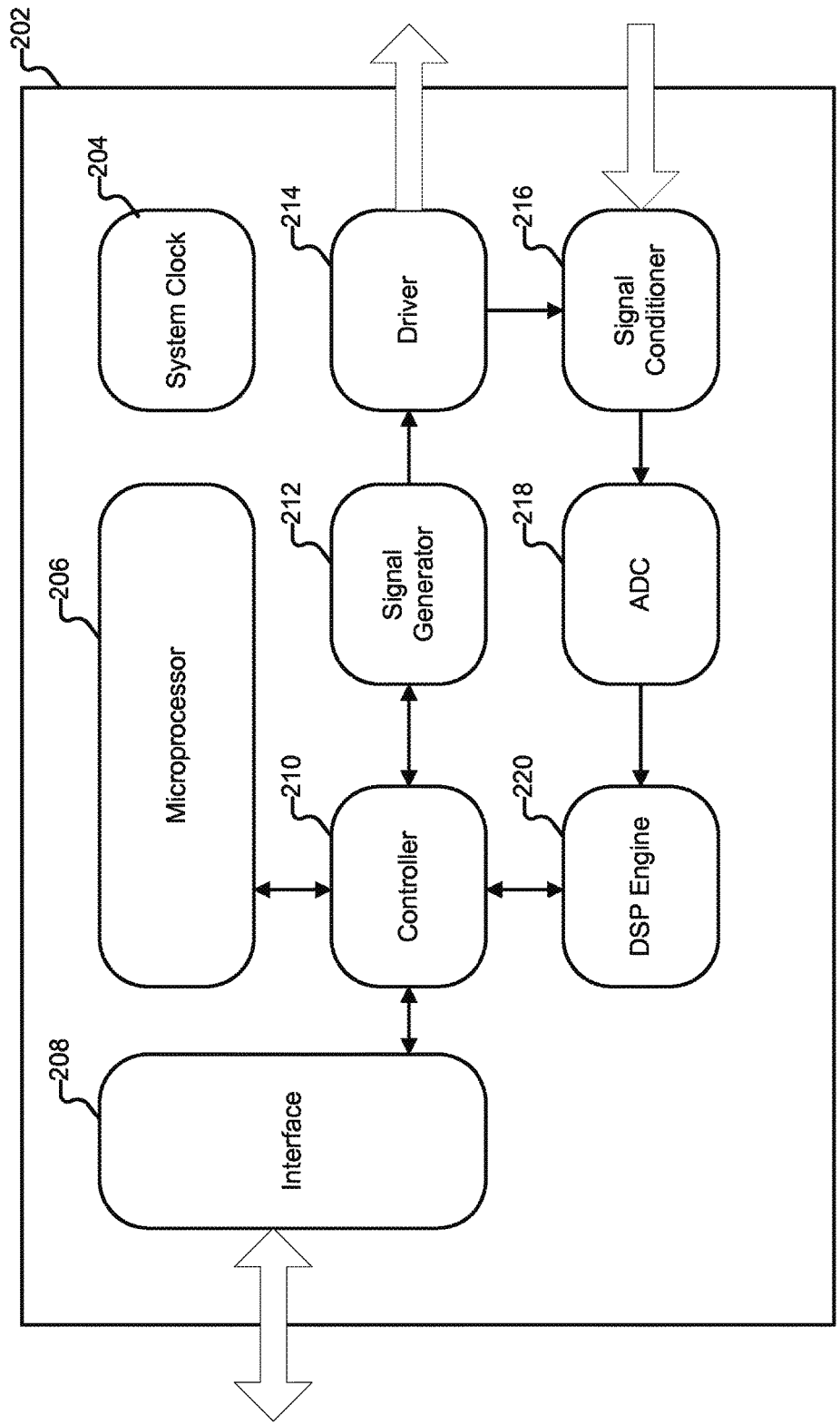
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions. Signal generator 212 generates signals to be used to propagate signals such as signals propagated by transmitters 104, 106, 108, and 110 of FIG. 1. For example, signal generator 212 generates pseudorandom binary sequence signals that are converted from digital to analog signals. Different signals (e.g., a different signal for each transmitter) may be generated by signal generator 212 by varying a phase of the signals (e.g., code division multiplexing), a frequency range of the signals (e.g., frequency division multiplexing), or a timing of the signals (e.g., time division multiplexing). Driver 214 receives the signal from generator 212 and drives one or more transmitters, such as transmitters 104, 106, 108, and 110 of FIG. 1, to propagate signals through a medium.

A signal detected from a sensor such as sensor 112 of FIG. 1 is received by detector 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 separates components corresponding to different signals propagated by different transmitters from the received signal and each component is correlated against a reference signal. The result of the correlation may be used by microprocessor 206 to determine a location associated with a user touch input. For example, microprocessor 206 compares relative differences of disturbances detected in signals originating from different transmitters and/or received at different receivers/sensors to determine the location. Interface 208 provides an interface for microprocessor 206 and controller 210 that allows an external component to access and/or control detector 202. For example, interface 208 allows detector 202 to communicate with application system 122 of FIG. 1 and provides the application system with location information associated with a user touch input.

Figure 3:
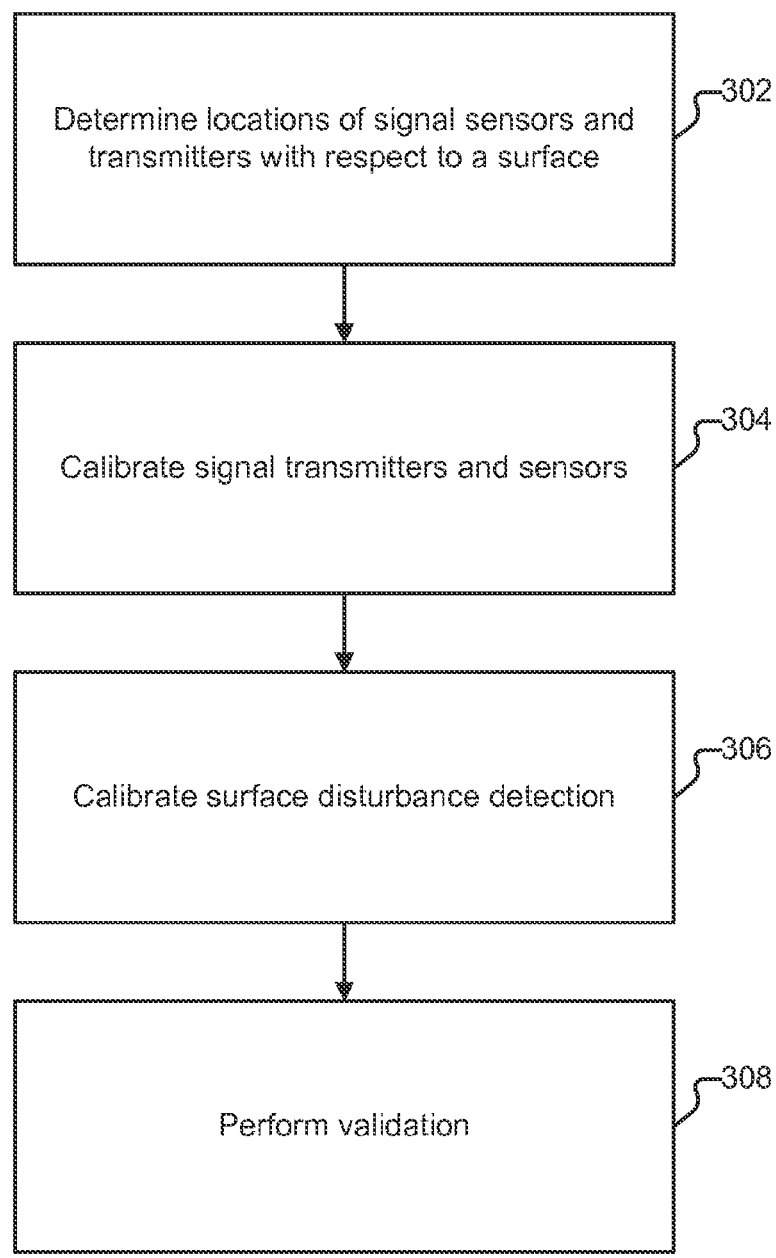
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 3 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal-to-noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection.

At 308, a validation of a touch detection system is performed. For example, the system of FIG. 1 and/or FIG. 2 is tested using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
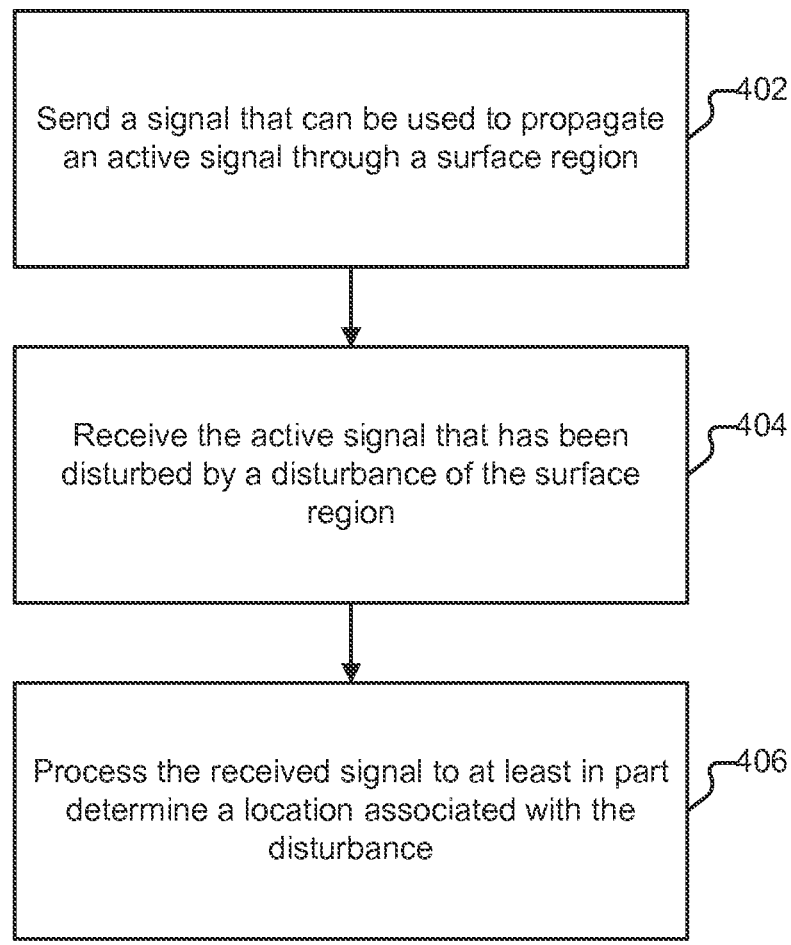
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch detector 202 of FIG. 2. At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in narrow/short peaks) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather than merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

In some embodiments, sending the signal includes determining the signal to be transmitted by a transmitter such that the signal is distinguishable from other signal(s) transmitted by other transmitters. In some embodiments, sending the signal includes determining a phase of the signal to be transmitted (e.g., utilize code division multiplexing/CDMA). For example, an offset within a pseudorandom binary sequence to be transmitted is determined. In this example, each transmitter (e.g., transmitters 104, 106, 108, and 110 of FIG. 1) transmits a signal with the same pseudorandom binary sequence but with a different phase/offset. The signal offset/phase difference between the signals transmitted by the transmitters may be equally spaced (e.g., 64-bit offset for each successive signal) or not equally spaced (e.g., different offset signals). The phase/offset between the signals may be selected such that it is long enough to reliably distinguish between different signals transmitted by different transmitters. In some embodiments, the signal is selected such that the signal is distinguishable from other signals transmitted and propagated through the medium. In some embodiments, the signal is selected such that the signal is orthogonal to other signals (e.g., each signal orthogonal to each other) transmitted and propagated through the medium.

In some embodiments, sending the signal includes determining a frequency of the signal to be transmitted (e.g., utilize frequency division multiplexing/FDMA). For example, a frequency range to be utilized for the signal is determined. In this example, each transmitter (e.g., transmitters 104, 106, 108, and 110 of FIG. 1) transmits a signal in a different frequency range as compared to signals transmitted by other transmitters. The range of frequencies that can be utilized by the signals transmitted by the transmitters is divided among the transmitters. In some cases if the range of frequencies that can be utilized by the signals is small, it may be difficult to transmit all of the desired different signals of all the transmitters. Thus the number of transmitters that can be utilized with frequency division multiplexing/FDMA may be smaller than can be utilized with code division multiplexing/CDMA.

In some embodiments, sending the signal includes determining a timing of the signal to be transmitted (e.g., utilize time division multiplexing/TDMA). For example, a time when the signal should be transmitted is determined. In this example, each transmitter (e.g., transmitters 104, 106, 108, and 110 of FIG. 1) transmits a signal in different time slots as compared to signals transmitted by other transmitters. This may allow the transmitters to transmit signals in a round-robin fashion such that only one transmitter is emitting/transmitting at one time. A delay period may be inserted between periods of transmission of different transmitters to allow the signal of the previous transmitter to sufficiently dissipate before transmitting a new signal of the next transmitter. In some cases, time division multiplexing/TDMA may be difficult to utilize in cases where fast detection of touch input is desired because time division multiplexing/TDMA slows down the speed of transmission/detection as compared to code division multiplexing/CDMA.

At 404, the active signal that has been disturbed by a disturbance of the surface region is received. The disturbance may be associated with a user touch indication. In some embodiments, the disturbance causes the active signal that is propagating through a medium to be attenuated and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, components of the received signal associated with different signals of different transmitters are separated. For example, different signals originating from different transmitters are isolated from other signals of other transmitters for individual processing. In some embodiments, determining the location includes comparing at least a portion of the received signal (e.g., signal component from a single transmitter) to a reference signal (e.g., reference signal corresponding to the transmitter signal) that has not been affected by the disturbance. The result of the comparison may be used with a result of other comparisons performed using the reference signal and other signal(s) received at a plurality of sensors. The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determine that a touch input has not been detected. An indication that a touch input has not been detected may be provided/outputted.

Figure 5:
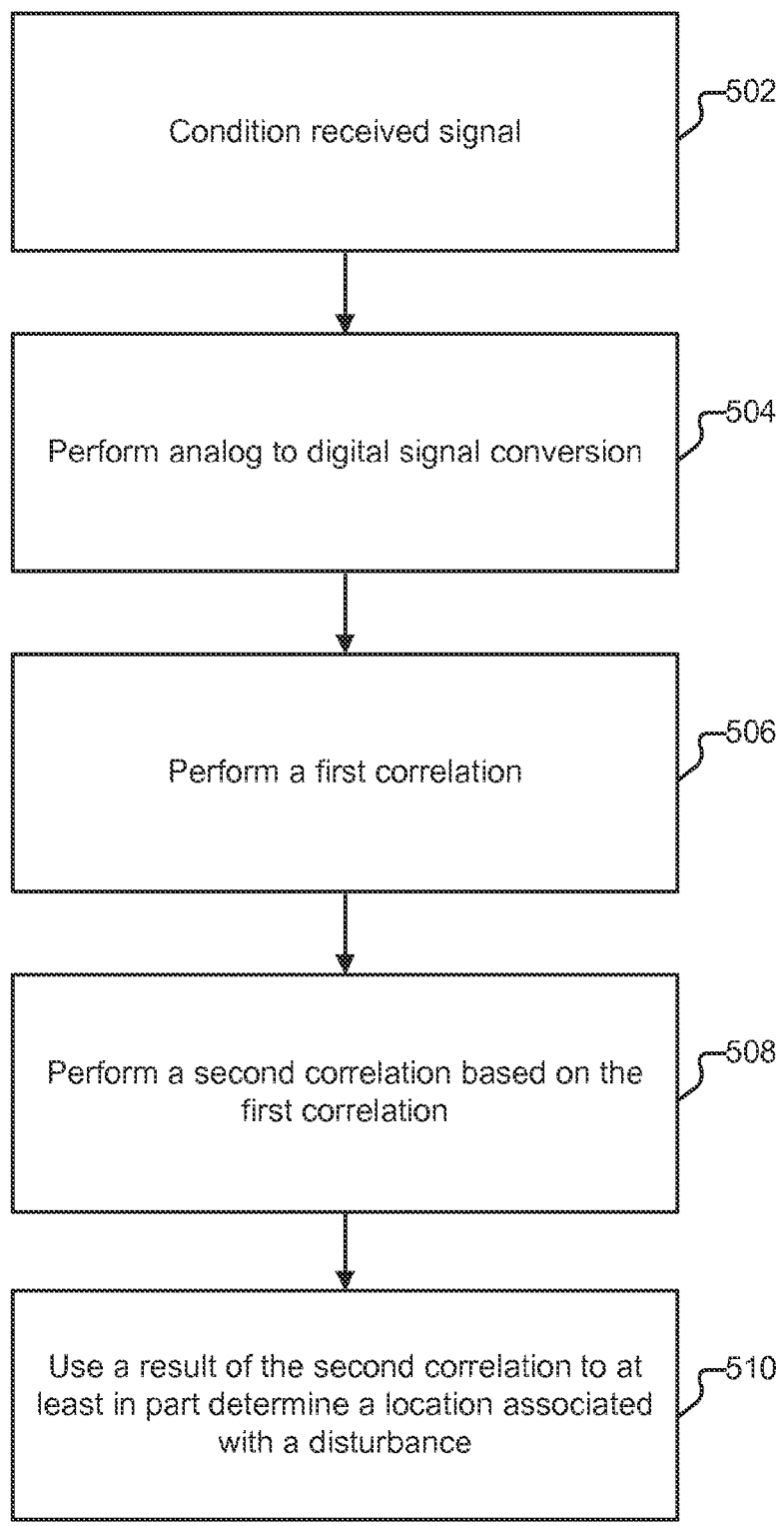
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 202 of FIG. 2.

At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal-to-noise ratio) for detection of a pseudorandom binary sequence included in the received signal and/or user touch input. In some embodiments, conditioning the received signal includes filtering out from the signal extraneous noise and/or vibrations not likely associated with a user touch indication. In some embodiments, the received signal is a signal of a signal transmitter that has been selectively isolated from signals emitted by other transmitters.

At 504, an analog to digital signal conversion is performed on the signal that has been conditioned at 502. In various embodiments, any number of standard analog to digital signal converters may be used. The resulting digital signal is used to perform a first correlation at 506. In some embodiments, components of the received signal associated with different signals/transmitters are separated. For example, different signals originating from different transmitters are isolated from other signals of other transmitters. In some embodiments, performing the first correlation includes correlating at least a portion of the converted signal (e.g., signal component from a single transmitter) with a reference signal (e.g., corresponding reference signal of the signal transmitter signal). Performing the correlation includes cross-correlating or determining a convolution (e.g., interferometry) of the converted signal with a reference signal to measure the similarity of the two signals, as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a force associated with a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal used in 506 is a simplified reference signal that can be used to efficiently correlate the reference signal over a relatively large time difference (e.g., lag-time) between the received and converted signal and the reference signal.

At 508, a second correlation is performed based on a result of the first correlation. Performing the second correlation includes correlating (e.g., cross-correlation or convolution similar to step 506) at least a portion of the converted signal in 504 with a second reference signal. The second reference signal is a more complex/detailed (e.g., more computationally intensive) reference signal as compared to the first reference signal used in 506. In some embodiments, the second correlation is performed in 508 because using the second reference signal in 506 may be too computationally intensive for the time interval required to be correlated in 506. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that corresponds to a disturbance caused by a touch input at a location on a surface of a propagating medium. In other embodiments, the second correlation is optional. For example, only a single correlation step is performed.

At 510, a result of the second correlation is used to at least in part determine a location associated with a disturbance. In some embodiments, determining the location includes comparing a determined time value where the signals of the second correlation are most correlated and comparing the determined time value with a reference time value (e.g., determined at 306 of FIG. 3) not associated with a touch input disturbance, to determine a time delay/offset or phase difference caused on at least a portion of the received signal due to the disturbance (e.g., caused by a touch input). In some embodiments, this time delay associated with a first signal transmitted by a first transmitter and received at a first receiver/sensor is compared with other determined time delays of different signals transmitted by other transmitters and received at the first receiver/sensor and other determined time delays of the first signal transmitted by the first transmitter and received at other receivers/sensors to calculate a location of the disturbance relative to the locations of the transmitters and/or sensors. By using the location of the transmitters/sensors relative to a surface of a medium that has propagated the received signal, a location on the surface where the disturbance originated may be determined.

Figure 6:
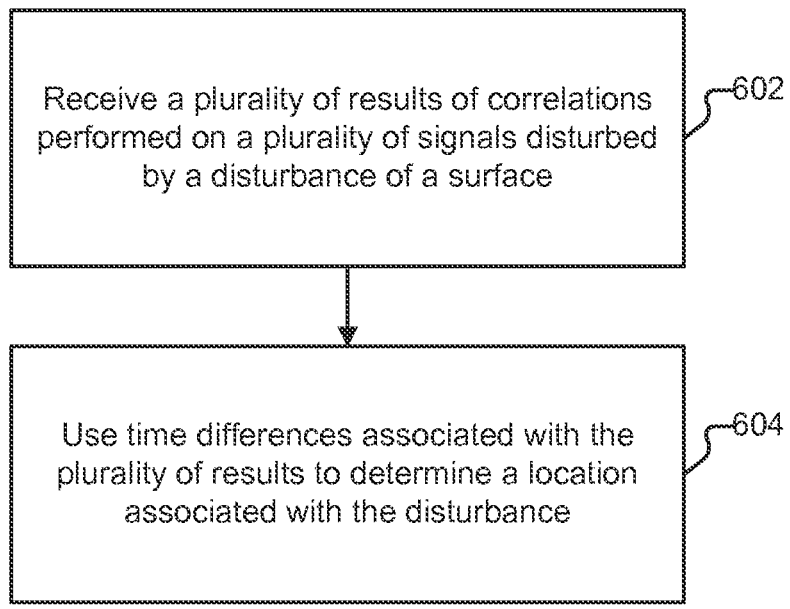
FIG. 6 is a flow chart illustrating an embodiment of a process for determining a location associated with a disturbance.

FIG. 6 is a flowchart illustrating an embodiment of a process for determining a location associated with a disturbance. In some embodiments, the process of FIG. 6 is included in 510 of FIG. 5. At 602, a plurality of results of correlations performed on a plurality of signals disturbed by a disturbance of a surface is received. For example, a result of the correlation performed at 508 of FIG. 5 is received. In some embodiments, a signal is propagated using transmitter 104 and sensors 114, 116, and 118 each receives the propagated signal that has been disturbed by a touch input on or near a surface of medium 102 of FIG. 1. In some embodiments, each transmitter (e.g., transmitters 104, 106, 108, and 110 of FIG. 1) of a touch input medium transmits a distinguishable signal that has been disturbed by a touch input and the distinguishable signals are each received at sensors (e.g., sensors 112, 114, 116, and 118 of FIG. 1) of the touch input medium for analysis.

The propagated signal may contain a predetermined signal and the predetermined signal is received at the various sensors. Each of the received signals is correlated with a reference signal to determine the results received at 602. In some embodiments, the received results are associated with a same signal content (e.g., same binary sequence) that has been freely propagated on a medium at the same time. In some embodiments, the received results are associated with different signal contents that have been disturbed by the same disturbance. In some embodiments, the received signal at a receiver/sensor includes components of a plurality of distinguishable signals transmitted by different transmitters and the received signal is separated into different received signals each corresponding to a transmitted signal of a signal transmitter for individual analysis to at least in part determine the results received at 602.

At 604, time differences associated with the plurality of results are used to determine a location associated with the disturbance. In some embodiments, each of the time differences is associated with a time when signals used in the correlation are most correlated. In some embodiments, the time differences are associated with a determined time delay/offset or phase difference caused on the received signal due to the disturbance. This time delay may be calculated by comparing a time value determined using a correlation with a reference time value that is associated with a scenario where a touch input has not been specified. The result of the comparison may be used to calculate a location of the disturbance relative to the locations of transmitters and/or sensors that received the plurality of signals. By using the location of the transmitters and/or sensors relative to a surface of a medium that has propagated the received signal, a location on the surface where the disturbance originated may be determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting a location of a touch input, comprising:
   a plurality of transmitters coupled to a propagating medium and each configured to emit a signal that is distinguishable from other signals emitted from other transmitters, wherein the plurality of transmitters are configured to emit the distinguishable signals through the propagating medium such that at least a portion of each of the distinguishable signals emitted from the plurality of transmitters freely propagate directly through the propagating medium without being directly guided by a reflector and each of the distinguishable signals ultrasonically encodes different binary data from other of the distinguishable signals to distinguish each of the distinguishable signals from each other; and
   a receiver coupled to the propagating medium and configured to receive the signals from the transmitters to detect the location of the touch input on a surface of the propagating medium as indicated by an effect of the touch input on each of the distinguishable signals, wherein the receiver is configured to receive the signals from the transmitters at least in part by being configured to receive a combined signal that includes at least a portion of each of the distinguishable signals disturbed by the same touch input at the location, each of the distinguishable signals that ultrasonically encodes different binary data from other of the distinguishable signals have been separately transmitted by a different transmitter of the plurality of transmitters, and the receiver is configured to separate and provide as output, each of the included portions of the distinguishable signals from the received combined signal and the each of the included portions of the distinguishable signals that has been separated and provided as the output corresponds to a same single contact of the touch input provided at the same location.

2. The system of claim 1, wherein at least one of the received signals is correlated with a corresponding expected signal without the touch input to determine the effect of the touch input on the at least one received signal.

3. The system of claim 1, wherein the signals emitted by the transmitters are ultrasonic signals.

4. The system of claim 1, wherein the signals emitted by the transmitters are distinguishable from each other by varying a phase of the signals emitted by the transmitters from each other emitted signal.

5. The system of claim 1, wherein emitting the signals of the transmitters includes utilizing code division multiplexing to distinguish the emitted signals.

6. The system of claim 1, wherein the signals emitted by the transmitters are distinguishable from each other by varying a frequency range of the signals emitted by the transmitters from each other emitted signal.

7. The system of claim 1, wherein emitting the signals of the transmitters includes utilizing frequency division multiplexing to distinguish the emitted signals.

8. The system of claim 1, wherein the signals emitted by the transmitters are distinguishable from each other by varying a timing of the signals emitted by the transmitters from each other emitted signal.

9. The system of claim 1, wherein emitting the signals of the transmitters includes utilizing time division multiplexing to distinguish the emitted signals.

10. The system of claim 1, wherein emitting the signal that is distinguishable from other signals emitted from other transmitters includes offsetting the signal from the other signals emitted from other transmitters.

11. The system of claim 1, wherein emitting the signal that is distinguishable from other signals emitted from other transmitters includes offsetting a pseudorandom binary sequence included in the signal by a predetermined number of bits from a pseudorandom binary sequence included in the other signals emitted by other transmitters.

12. The system of claim 11, wherein a relative offset amount between a first signal and a second signal emitted by one or more of the transmitters is equal to a relative offset amount between the second signal and a third signal emitted by one or more of the transmitters.

13. The system of claim 1, wherein the signals emitted by the transmitters are orthogonal to each other signal.

14. The system of claim 1, wherein the effect of the touch input on each of the distinguishable signals includes a delay caused on each of the distinguishable signals by the touch input.

15. The system of claim 14, wherein detecting the location includes comparing the delay of each of the distinguishable signals.

16. The system of claim 1, wherein the touch input is associated with one of more of the following: a location coordinate, a gesture, a time, a status, a direction, a velocity, a force magnitude, a proximity, a pressure, and a size.

17. The system of claim 1, wherein the transmitters each includes a different transducer.

18. The system of claim 1, wherein at least one of the distinguishable signals includes a Zadoff-Chu sequence.

19. The system of claim 1, wherein detecting the location of the touch input includes comparing each of the separated distinguishable signals with a corresponding reference signal to determine comparison results and comparing one of the comparison results of one of the received distinguishable signals with another one of the comparison results of another one of the received distinguishable signals.

20. A method for detecting a location of a touch input, comprising:
   emitting from each of a plurality of transmitters coupled to a propagating medium a signal that is distinguishable from other signals emitted from other transmitters, wherein the distinguishable signals are emitted through the propagating medium such that at least a portion of each of the distinguishable signals emitted from the plurality of transmitters freely propagate directly through the propagating medium without being directly guided by a reflector and each of the distinguishable signals ultrasonically encodes different binary data from other of the distinguishable signals to distinguish each of the distinguishable signals from each other; and receiving from at least one receiver coupled to the propagating medium the signals from the transmitters to detect the location of the touch input on a surface of the propagating medium as indicated by an effect of the touch input on each of the distinguishable signals, wherein receiving the signals from the transmitters includes receiving a combined signal that includes at least a portion of each of the distinguishable signals disturbed by the same touch input at the location, each of the distinguishable signals that ultrasonically encodes different binary data from other of the distinguishable signals have been separately transmitted by a different transmitter of the plurality of transmitters, and separating and providing as output, each of the included portions of the distinguishable signals from the received combined signal, and the each of the included portions of the distinguishable signals that has been separated and provided as the output corresponds to a same single contact of the touch input provided at the same location.

21. A computer program product for detecting a location of a touch input, the computer program product being embodied in a non-transitory computer readable storage medium and comprising computer instructions for:

emitting from each of a plurality of transmitters coupled to a propagating medium a signal that is distinguishable from other signals emitted from other transmitters, wherein the distinguishable signals are emitted through the propagating medium such that at least a portion of each of the distinguishable signals emitted from the plurality of transmitters freely propagate directly through the propagating medium without being directly guided by a reflector and each of the distinguishable signals ultrasonically encodes different binary data from other of the distinguishable signals to distinguish each of the distinguishable signals from each other; and receiving from at least one receiver coupled to the propagating medium the signals from the transmitters to detect the location of the touch input on a surface of the propagating medium as indicated by an effect of the touch input on each of the distinguishable signals, wherein receiving the signals from the transmitters includes receiving a combined signal that includes at least a portion of each of the distinguishable signals disturbed by the same touch input at the location, each of the distinguishable signals that ultrasonically encodes different binary data from other of the distinguishable signals have been separately transmitted by a different transmitter of the plurality of transmitters, and separating and providing as output, each of the included portions of the distinguishable signals from the received combined signal, and the each of the included portions of the distinguishable signals that has been separated and provided as the output corresponds to a same single contact of the touch input provided at the same location.

* * * * *